Nov. 18, 1969  M. J. MEYER  3,478,768
DEVICE FOR MEASURING AND MIXING MEASURED AMOUNTS OF MATERIAL
Filed Sept. 13, 1965  3 Sheets-Sheet 1
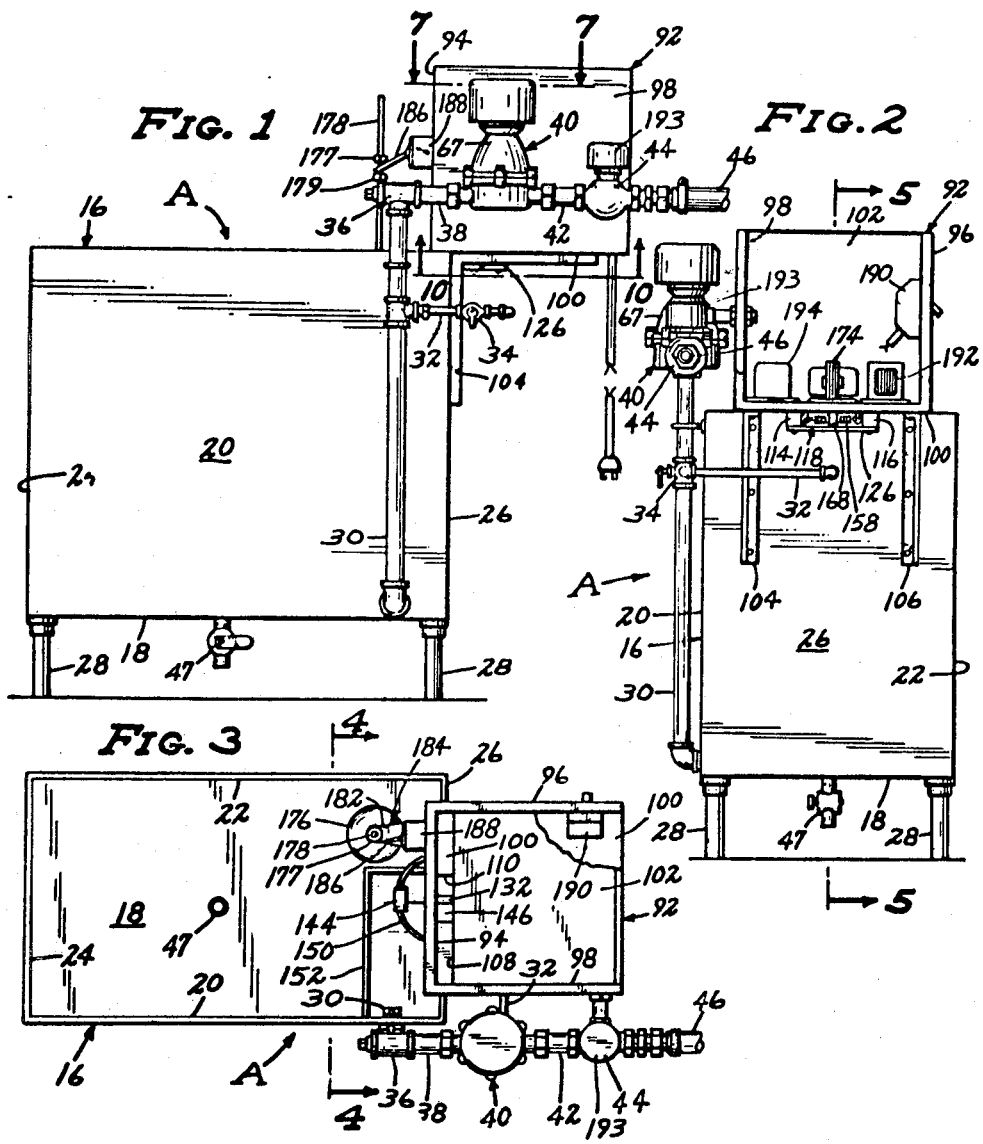
INVENTOR.
MAURICE J. MEYER
BY Caswell, Lagund
& Wickes
ATTORNEYS

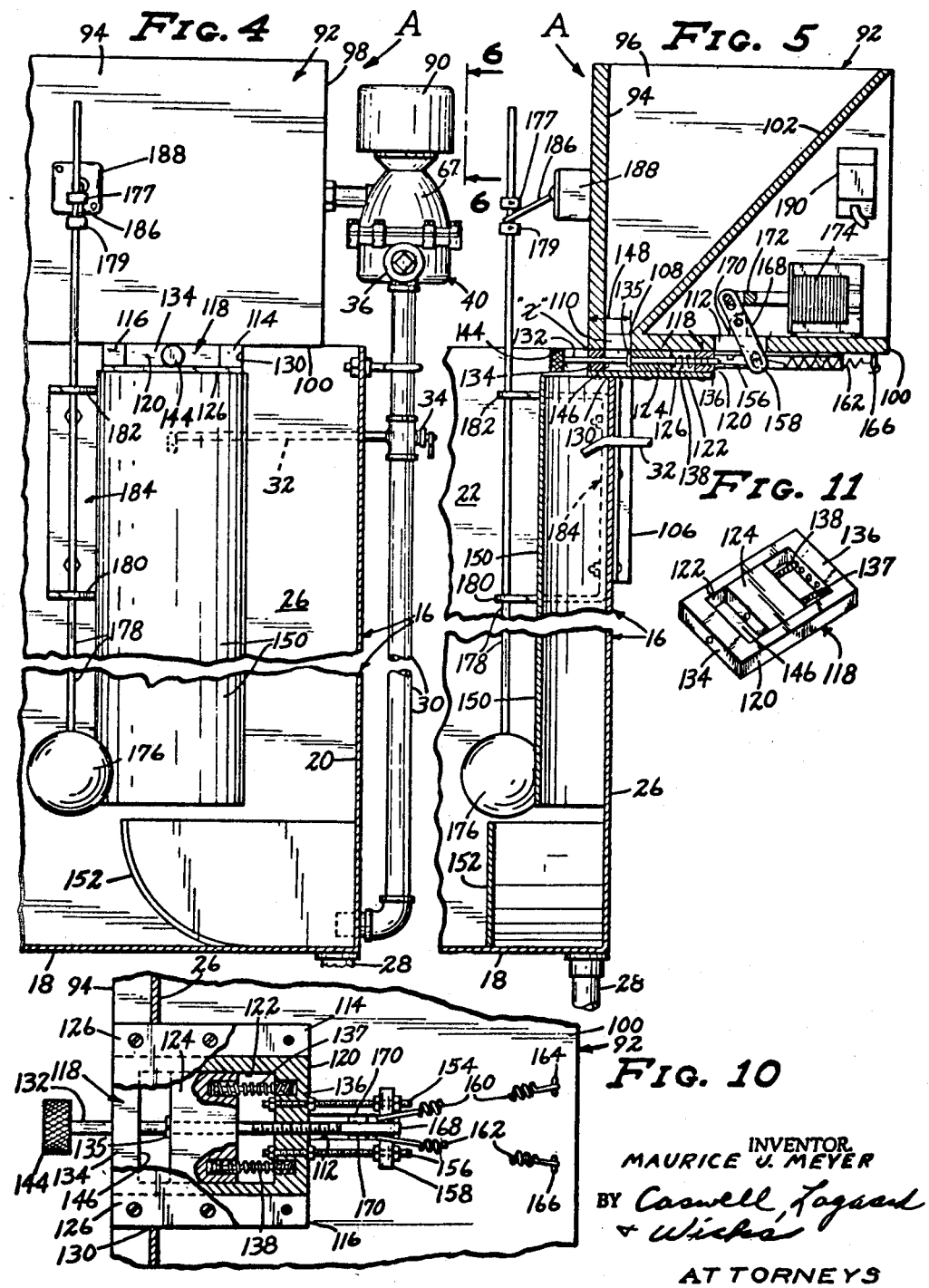

Nov. 18, 1969 M. J. MEYER 3,478,768
DEVICE FOR MEASURING AND MIXING MEASURED AMOUNTS OF MATERIAL
Filed Sept. 13, 1965 3 Sheets-Sheet 3
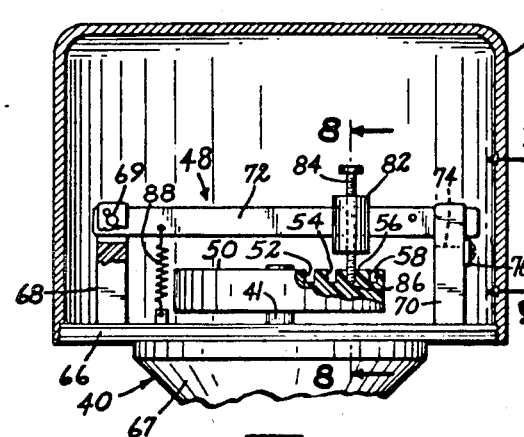
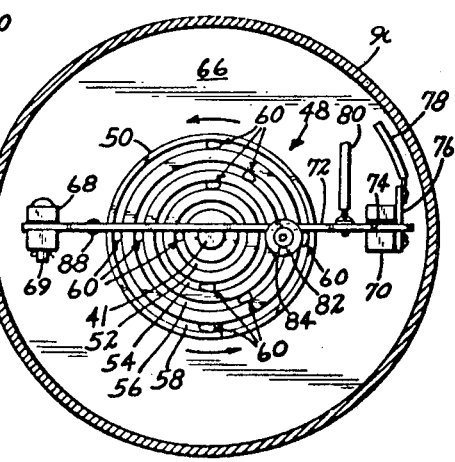
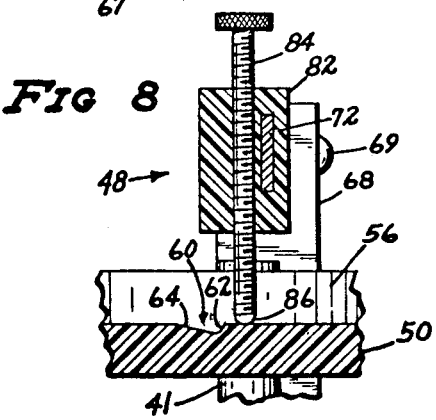
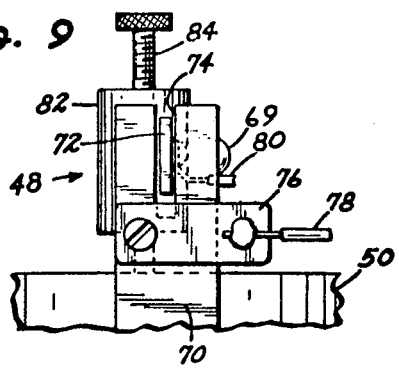
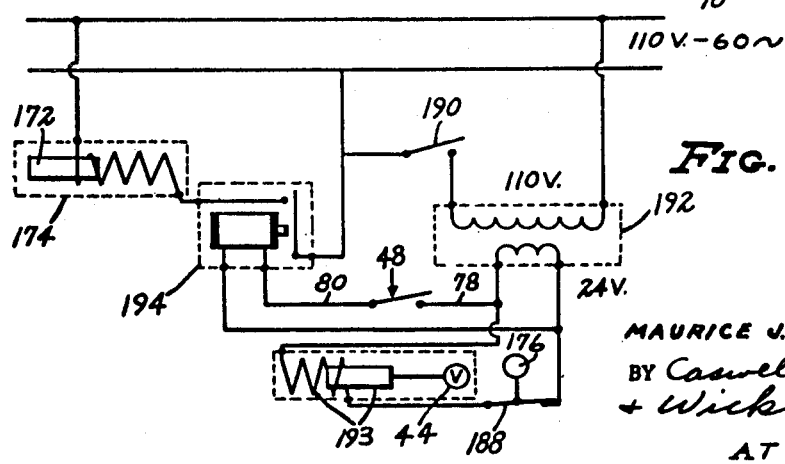
INVENTOR.
MAURICE J. MEYER
BY Caswell, Lagaard
+ Wicks
ATTORNEYS United States Patent Office 3,478,768
Patented Nov. 18, 1969

3,478,768
DEVICE FOR MEASURING AND MIXING MEASURED AMOUNTS OF MATERIAL
Maurice J. Meyer, St. Paul, Minn., assignor to M & M Distributing Company, Incorporated, St. Paul, Minn.
Filed Sept. 13, 1965, Ser. No. 486,799
Int. Cl. G05d 11/13
U.S. Cl. 137—101.21                7 Claims

ABSTRACT OF THE DISCLOSURE

The disclosure relates to a device for mixing a substance with a liquid in a predetermined ratio including a reservoir, a receptacle for containing a first material, first valving means mounted on the receptacle, a first solenoid for actuating the first valve means, a conduit for supplying a fluid second material to the reservoir, a hydraulic motor interposed in the conduit through which the second material flows and which operates the motor, second valve means positioned in the conduit to control the flow of second material to the motor, a second solenoid for opening the second valve means, a switch for actuating the first solenoid including a disc mounted on a shaft of the motor, said disc having a plurality of annular concentric grooves, each groove being formed with spaced detents in the bottom thereof, a switch arm pivotally connected to the motor and overlying the disc, a contact bar mounted on the motor, a pin carried by the switch arm and extending into one of said grooves adapted to drop into a detent thereof when the disc is rotated and cause the switch arm to contact the contact bar and close the switch to energize the first solenoid and actuate the first valve means, a float in the reservoir, a switch connected to the float for actuation thereby, said switch connected to the second solenoid for deenergizing the same to close the second valve which stops the motor when the mixture of first and second material reaches a predetermined level.

---

The invention relates to an improvement in measuring and mixing devices and more particularly to a device which will produce and mix a predetermined amount of a first material with a predetermined amount of a second material, the amount of the first material determined by the amount of the second material produced.

It is an object of the invention to provide a device which will measure and mix predetermined amounts of materials such as a detergent and water for a single batch and also produce a continuous supply of water and detergent mixture in a preselected ratio of water to detergent.

It is a further object of the invention to provide a switch operated by a hydraulic motor, the motor actuated by a material in the form of a propellant and the switch operating means for discharging a measured amount of another material into a reservoir for mixing with the other material.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:
FIGURE 1 is a side elevational view of the device.
FIGURE 2 is a rear end view thereof.
FIGURE 3 is a top plan view.
FIGURE 4 is an enlarged sectional view on the line 4—4 of FIGURE 3.
FIGURE 5 is a sectional view on the line 5—5 of FIGURE 2.
FIGURE 6 is a view on the line 6—6 of FIGURE 4 portions of which are in section, other portions being broken away.
FIGURE 7 is a sectional view on the line 7—7 of FIGURE 1.
FIGURE 8 is a sectional view on the line 8—8 of FIGURE 6.
FIGURE 9 is a view taken on the line 9—9 of FIGURE 6.
FIGURE 10 is a bottom plan view of a portion of the hopper showing the hopper valve, portions of which are in section, other portions being broken away.
FIGURE 11 is a perspective view of the valve block removed from the hopper valve.
FIGURE 12 is a schematic diagram of the wiring circuit used in the present invention.

Referring to the drawings in detail, the device A includes the reservoir 16 formed of the bottom 18, the side walls 20 and 22, and the end walls 24 and 26, the reservoir being open at the top and provided with the four legs 28. Further provided is the water inlet pipe portion 30 the lower end of which is connected to and extends through the lower portion of the side wall 20 into the reservoir 16. Connected at one end to water inlet portion 30 is the bypass 32 which has mounted thereon the valve 34. The other end of the bypass line 32 extends into the tank 16 through the upper portion of the end wall 26.

Connected to the upper end of the water inlet line portion 30 by means of the L-connector member 36 is the inlet line portion 38 and connected to the line portion 38 is a conventional hydraulic motor 40 such as used in water meters with the counter member removed from the shaft 41 thereof. The opposite side or inlet side of the motor 40 is connected to the inlet line portion 42 which is connected to the solenoid operated water shut-off valve 44. The shut-off valve 44 is connected to the inlet line portion 46 and is held in a closed position by a spring not shown.

The flow of a liquid propellant via the inlet line through the motor 40 causes the shaft 41 of the motor to rotate. The reservoir 16 is equipped with the drain or take-off valve 47.

The numeral 48 designates a knife switch which includes the disc member 50 mounted on the motor shaft 41. The disc 50 has formed in the top surface thereof the four concentric annular grooves 52, 54, 56 and 58. Each groove has formed in the bottom surface thereof one or more detents 60 having the configuration as particularly shown in FIGURES 7 and 8. Each detent 60 has the forward arcuate portion 62 and the ramp portion 64 leading from the portion 62 up to the bottom of the grooves 52–58. The groove 52 includes one detent 60 while the groove 54 is formed with two detents 60 which are 180° apart. The groove 56 is formed with three detents 60 which are 120° apart, and the groove 58 is formed with four detents 60 wihch are 90° apart. The switch disc 50 may be formed with a greater or lesser number of concentric grooves and each groove may be formed with a greater or lesser number of detents whereby the switch feature hereinafter described, may be actuated at different intervals relative to the rotation of the disc 50.

Further provided is the table 66 which is secured to the upper end of the housing 67 enclosing the motor 40 and positioned beneath the meter disc 50. Secured to the table 66 is the post 68 and the support 70 spaced therefrom on a line extended substantially from a diameter of the disc 50. The numeral 72 designates a switch arm which is pivotally connected at one end to the post 68 by means of the pin 69 and of a length to extend beyond the support 70. The upper end of the support 70 is formed with a slot 74 in which the switch arm 72 freely moves. Secured to the outer side of the support 70 and normal to the slot 74 is the switch contact bar member 76. Lead wire 78 is connected to bar 76, and lead wire 80 is connected to switch arm 72 as hereinafter described. As the arm 72 moves downwardly in the slot 74 it comes in contact with and rests upon the bar 76 as will be hereinafter described.

Further provided is the pin carrier 82 which is slidably mounted on the arm 72, and threadedly mounted on this pin carrier for vertical adjustment and extending therethrough is the pin 84. The pin carrier 82 may be moved longitudinally on the arm 72 so that the lower end of the pin 84 is caused to extend into and ride on the bottom of any of the grooves 52, 54, 56 or 58. The lower end of the pin 84 is rounded, as at 86, whereby frictional contact with the bottom of a groove such as 56 is reduced to a minimum, and entrance into and exit from detents 60 is effected with a minimum of shock. The switch arm 72 is normally urged downwardly by means of the spring 88 secured at one end to the arm 72 and at the other end to the table 66. This action causes the lower end of the pin 84 to maintain pressure contact with the bottom of a groove such as 56 in the disc 50 as the disc is rotated. The motor switch 48 is entirely covered by the cup-shaped cap member 90.

The pin 84 is adjustably positioned relative to the arm 72 whereby there is an air gap between the outer end of the arm 72 and the bar 76 when the lower end of the pin 84 is riding on the bottom of a groove such as 56. As the disc 50 is rotated by the motor 40, the lower end of the pin 84 will drop into a detent 60 and ride upwardly and outwardly therefrom on the ramp portion 64 and thence into the bottom of the groove. The pin 84 is adjusted in the carrier 82 so that when the lower end thereof drops into a detent 60 the lower outer edge of the arm 72 contacts the switch bar 76 to make contact, and the arm 72 is moved upwardly out of contact with the bar 76 as the end of pin 84 rides up the ramp portion 64 of a detent 60 and into the bottom of a groove such as 56. When the contact is made between arm 72 and bar 76, a solenoid is energized for the purpose hereinafter set forth. The disc 50 with detents 60 and the pin 84 form cam means for causing a switch contact of arm 72 and bar 76.

The numeral 92 designates a receptacle in the form of a hopper for containing a supply of material such as a powdered detergent for mixing with a fluid material supplied by means of the inlet line 30 and motor 40. The hopper includes the inner vertical wall 94, the side walls 96 and 98, the bottom wall 100 and the inclined inner wall 102 secured between the side walls 96 and 98. The hopper 92 is mounted on the reservoir 16 by means of the angle brackets 104 and 106 secured to the reservoir rear wall 26 and the hopper bottom 100. The inner lower edge 108 of the inclined wall 102 is spaced inwardly from the inner wall 94, and formed in the bottom 100 between the lower edge 108 of the wall 102 and the wall 94 is the discharge opening 110. The bottom 100 is also formed with the opening 112 the purpose of which will be hereinafter explained.

Secured to the underside of the bottom 100 of the hopper are the two spaced guide blocks 114 and 116, and slidably positioned between the guide blocks is the block valve 118. The valve 118 is formed of a flat rectangular piece 120, and formed therein is the rectangular opening 122. Slidably positioned within the opening 122 of the valve 118 is the flat rectangular valve block 124, FIGURES 5, 10 and 11, which is held in such slidable position by means of the plate 126 secured to the underside of the guide blocks 114 and 116.

The hopper 92 is mounted on the reservoir wall 26 with the inner wall 94 of the hopper slightly inboard of the wall 26, particularly FIGURE 5, and the lower face of the bottom 100 is in alignment with upper edge of the reservoir wall 26. The reservoir end wall 26 is formed with a recess 130 which receives the guide blocks 114 and 116, the block valve 118 and plate 126.

The valve block 124 is adjustably held in position within the block valve 118 by means of the threaded rod 132 which extends freely through the inner end portion 134 of the piece 120 and the valve block 124 and which threadedly engages the outer end portion 136 of the piece 120. The valve block 124 is normally urged toward the end portion 134 and against the stop 135 on the rod 132 by means of the springs 137 and 138 extending into recesses formed in the block 124 and end portion 136.

The rod 132 has formed on the inner end thereof the knob 144, and upon turning the knob in one direction the valve block 124 is moved towards the end portion 136 against the action of the springs 137 and 138. Upon turning the knob 144 in the opposite direction the valve block 124 is moved towards the inner end portion 134 with the aid of the springs 137 and 138. As the valve block 124 is moved to and from the inner end portion 134, the area between the end portion 134 and the valve block 124 is thereby adjustably changed. The space between the end portion 134 and the edge of the valve block 124 together with the sides of the opening 122 and the plate 126 form a pocket 146 of adjustable size for receiving material from the hopper through the discharge opening 110. Briefly, the pocket 146 is adjusted to a size to receive the desired amount of material from the hopper 92 for discharge into the reservoir 16. Discharge of material from the pocket 146 is accomplished by movement of the block valve 118 towards wall 94 as the result of the switch 48 energizing a solenoid hereinafter described. As a result of this movement of valve 118 the inner edge of the valve block portion 124 travels from the position shown in FIGURE 5 to point $x$ substantially in alignment with the outer face of wall 94 of the hopper 92. The extent of such travel is shown by the double-headed arrow 148. As a result of the movement of the block valve 118, the material in the pocket 146 is pushed inwardly and over the inner edge of the fixed plate 126 where it drops downwardly into the reservoir 16.

A baffle 150 is provided which is spaced from and secured to the wall 26 of the reservoir 16 with the lower end thereof spaced from the bottom 18 of the reservoir. The material ejected from the pocket 146 is confined within the baffle 150 as it falls to the bottom of the reservoir. As the material falls it begins a pre-mixing with liquid from the bypass line 32. To affect an agitation and positive mixing of the liquid and material from the hopper 92 a baffle 152 is secured to the reservoir 16 which directs the liquid upwardly into the reservoir from the inlet line 30.

The block valve 118 has secured thereto the spaced threaded rods 154 and 156, and secured to the outer ends of the rods 154 and 156 is the transverse block 158. Connected to the block 158 are the pair of springs 160 and 162 which are anchored to the eyes 164 and 166, respectively, which are secured to the bottom 100 of the hopper 92. The springs 160 and 162 normally urge the block valve 118 in the closed position shown in FIGURES 5 and 10.

The numeral 168 designates a bar which is pivotally mounted intermediate its ends on the upstanding bracket 170, secured upon the hopper bottom 100 at the opening 112. The bar 168 extends through the opening 112 formed in the bottom 100. The upper end of the bar 168 is pivotally connected to the outer free end of the arm 172 of the solenoid 174, and the lower end of the bar 168 is pivotally connected to the transverse block 158. As the solenoid 174 is energized, the arm 172 thereof pivots the bar 168 thereby moving the block valve 118 towards hopper wall 94 against the action of the springs 160 and 162 whereby the valve block 124 forces material in the pocket 146 into the reservoir 16 as heretofore set forth. The springs 160 and 162 return the block valve 118 to its start position shown in full lines particularly in FIGURES 5 and 10.

Further provided is the reservoir float 176 connected to the lower end of the rod 178 slidably mounted in the end members 180 and 182 of the bracket 184. The upper end of the rod 178 is adjustably connected to the toggle 186 of the normally closed toggle float switch 188 mounted on the wall 94 of the hopper 92 by means of the toggle arm positioned between the adjustable shaft stops 177 and 179. Mounted on the hopper wall 96 is the main switch 190, and further shown is the step-down transformer 192, the relay 194, and the water shut-off solenoid actuated valve 44 all included in the circuitry diagram of FIGURE 12 and the various other figures.

The device A is used and operated in the following manner: Let it be assumed, as an example of use, that a substance such as a powdered detergent is to be mixed with water and that the motor 40 delivers six gallons of water to reservoir 16 with one complete rotation of the shaft 41 thereof. The hopper 92 is filled with a detergent and let it also be assumed that the amount of detergent required for each six gallons of water is the contents of three full pockets 146 at a given pocket size. The pocket 146 adjusted, as set out above, to receive one-third of the amount of detergent required for mixture with the six gallons of water. As a result of this requirement, the pin 84 is positioned to ride in groove 56 of switch disc 50 having the three detents 60. The float 176 is adjusted to open switch 188 when a predetermined number of gallons of water are deposited in reservoir 16.

The main switch 190 is closed which energizes the transformer 192 and supplies a voltage of 24 volts to the solenoid 193 of the water shut-off valve 44 which opens the valve when float switch 188, which is connected in series therewith, is closed and is calling for water. Also connected in series to the low side of the transformer 192 is the motor switch 48 and the coil of relay 194. As water flows through the motor 40 and the disc 50 thereof is rotated, the switch 48 is closed with the arm 72 contacting bar 76 as a result of the pin 84 dropping into a detent 60 of the groove 56. As arm 72 makes contact with bar 76, the solenoid 174 is energized thereby actuating block valve 118 causing a discharge of the material in pocket 146 into the reservoir 16. The switch disc 50 continues to rotate whereby the pin 84 drops into a second detent 60 again closing the switch 49 and energizing the solenoid 174 to cause a second discharge of material from pocket 146. Upon further rotation of the switch disc 50 the pin 84 drops into the third detent of groove 56 to cause a third discharge of material in the manner above, and at this time the disc 50 has completed one revolution which has deposited six gallons of water into the tank at the rate of flow heretofore mentioned together with the requisite amount of detergent.

As the level of the water and detergent mixture rises in the reservoir 16 the float rises causing the float switch 188 to be opened thereby deenergizing the solenoid 193 of the water shut-off valve 44 and closing the valve. With the water supply shut off the motor 40 ceases to be actuated with the result that the switch disc 50 is not operated. As a result of the above a single batch of water and detergent has been combined and mixed in the reservoir which may be drawn off by means of the drain 47.

In certain uses of a water and detergent mixture a continuous supply of the same may be desired with a continuous draw-off at valve 47. The device A will produce such a continuous supply of mixed detergent and water by adjusting the float and drawing off the mixture so that the float 176 never actuates the switch 188 as the water level rises in the reservoir 16 which closes valve 44. As a result a supply of water is continuously called for and supplied to and delivered from the motor 40, and the continuous action of the switch 48 produces a continuous supply of detergent to form a mixture having a preselected ratio of water and detergent. As will be seen the pin 84 may be placed in a groove 52, for example, whereby the solenoid 174 is actuated but once for one revolution of the switch disc 50 due to the single detent 60. Further, the disc 50 may have additional grooves and each groove may have any number of detents 60.

Having thus described the invention what is claimed as new and desired to be secured by Letters Patent is:

1. A device for measuring and mixing measured amounts of materials comprising:
    (a) a reservoir,
    (b) a receptacle for containing a supply of a first material mounted on said reservoir,
    (c) normally closed first valve means mounted on said receptacle,
    (d) a first solenoid for actuating said first valve means to dispense a measured amount of first material from said receptacle into said reservoir,
    (e) a conduit for supplying a fluid second material to said reservoir for mixing with said first material,
    (f) a hydraulic motor having a known rate of flow therethrough interposed in said conduit and through which said second material flows to operate the same,
    (g) said motor having a shaft extending therefrom and rotated thereby,
    (h) normally closed second valve means positioned in said conduit to control the flow of said second material to said motor,
    (i) a second solenoid for opening said second valve means,
    (j) a normally open switch for actuating said first solenoid including a disc mounted on said shaft for rotation thereby,
    (k) said disc having a plurality of annular concentric grooves formed therein,
    (l) each of said grooves having one or more spaced detents formed in the bottom thereof,
    (m) a single switch arm pivotally connected to said motor and overlying a diameter of said disc,
    (n) a contact bar mounted on said motor,
    (o) a pin adjustably secured to said switch arm and extending into one of said grooves adapted to drop into a detent thereof when said disc is rotated and cause said switch arm to contact said contact bar and close said switch thereby energizing said first solenoid to actuate said first valve means to cause a discharge of first material from said receptacle into said reservoir,
    (p) a float in said reservoir,
    (q) a normally closed switch connected to said float for actuation by said float,
    (r) said switch connected to said second solenoid adapted to deenergize the same to close said second valve means and stop the motor when the mixture of first and second material reaches a predetermined level in said reservoir.

2. The device of claim 1 in which:
    (a) said first valve means includes a block member having
    (b) an opening formed therein and defining a pocket,
    (c) said receptacle having a discharge opening,
    (d) means for slidably mounting said block member on said receptacle for registration of said opening thereof with said discharge opening by means of said first solenoid, and
    (e) means for adjusting the position of said pocket of said block member relative to said discharge opening to control the amount of material discharged from said receptacle.

3. A device for measuring and mixing measured amounts of material comprising:
    (a) a reservoir,
    (b) a receptacle for a supply of a first material,
    (c) normally closed first valve means mounted on said receptacle,
    (d) means for actuating said first valve means to dispense a measured amount of first material from said receptacle into said reservoir, (e) a conduit for supplying a fluid second material to said reservoir for mixing with said first material,
(f) a hydraulic motor having a known rate of flow therethrough interposed in said conduit and through which said second material flows to operate the same,
(g) said motor having a shaft extending therefrom and rotated thereby,
(h) normally closed second valve means positioned in said conduit to control the flow of said second material to said motor,
(i) means for opening said second valve means,
(j) a normally open switch for actuating said first valve actuating means including a disc mounted on said shaft for rotation thereby,
(k) said disc having a plurality of annular concentric grooves formed therein,
(l) each of said grooves having one or more spaced detents formed in the bottom thereof,
(m) a single switch arm pivotally connected to said motor and overlying a diameter of said disc,
(n) a contact bar mounted on said motor,
(o) a pin adjustably secured to said switch arm and extending into one of said grooves adapted to drop into a detent thereof when said disc is rotated and cause said switch arm to contact said contact bar and close said motor switch thereby energizing said first solenoid to actuate said first valve means to cause a discharge of first material from said receptacle into said reservoir,
(p) a float in said reservoir,
(q) a normally closed switch connected to said float for actuation by said float,
(r) said switch connected to said second valve actuating means adapted to actuate the same to close said second valve means when the mixture of first and second material reaches a predetermined level in said reservoir.

4. The device of claim 3 in which:
(a) said first valve means includes a block member having
(b) an opening formed therein and defining a pocket,
(c) said receptacle having a discharge opening,
(d) means for slidably mounting said block member on said receptacle for registration of said opening thereof with said discharge opening by means of said valve actuating means,
(e) and means for adjusting the position of said pocket of said block member relative to said discharge opening to control the amount of material discharged from said receptacle.

5. A device for measuring and mixing measured amounts of materials comprising:
(a) a reservoir,
(b) a receptacle for containing a supply of a first material mounted on said reservoir,
(c) normally closed first valve means mounted on said receptacle,
(d) a first solenoid for actuating said first valve means to dispense a measured amount of first material from said receptacle into said reservoir,
(e) a conduit for supplying a fluid second material to said reservoir for mixing with said first material,
(f) a hydraulic motor having a known rate of flow therethrough interposed in said conduit and through which said second material flows to operate the same,
(g) said motor having a shaft extending therefrom and rotated thereby,
(h) normally closed second valve means positioned in said conduit to control the flow of said second material to said motor,
(i) a second solenoid for opening said second valve means,
(j) a normally open switch for actuating said first solenoid including a disc mounted on said shaft for rotation thereby,
(k) said disc having a plurality of annular concentric grooves formed therein,
(l) each of said grooves having one or more spaced detents formed in the bottom thereof,
(m) a single switch arm pivotally connected to said motor and overlying a diameter of said disc,
(n) a contact bar mounted on said motor,
(o) a pin adjustably secured to said switch arm and extending into one of said grooves adapted to drop into a detent thereof when said disc is rotated and cause said switch arm to contact said contact bar and close said switch thereby energizing said first solenoid to actuate said first valve means to cause a discharge of first material from said receptacle into said reservoir, and
(p) means for deenergizing said second solenoid to close said second valve means to stop the flow of liquid to said motor to thereby stop the motor.

6. A switch comprising:
(a) a support means,
(b) a disc rotatably mounted on said support means,
(c) said disc having a plurality of annular concentric grooves formed therein,
(d) each of said grooves having one or more spaced detents formed in the bottom thereof,
(e) a rigid switch arm pivotally mounted on said support means and overlying a diameter of said disc,
(f) a contact bar mounted on said support means adapted for contact with said switch arm,
(g) a pin adjustably secured to said switch arm extending into one of said grooves adapted to drop into a detent thereof when said disc is rotated and allow said switch arm to contact said contact bar and close said switch.

7. A switch comprising:
(a) support means,
(b) a disc rotatably mounted on said support means,
(c) said disc having a plurality of annular concentric grooves formed therein,
(d) each of said grooves having one or more spaced detents formed in the bottom thereof,
(e) a rigid switch arm pivotally mounted on said support means and overlying a diameter of said disc,
(f) a contact bar mounted on said support means adapted for contact with said switch arm,
(g) a pin adjustably secured to said switch arm extending into one of said grooves adapted to drop into a detent thereof when said disc is rotated and allow said switch arm to contact said contact bar and close said switch,
(h) spring means normally urging said switch arm toward said contact bar.

References Cited

UNITED STATES PATENTS

| | | | |
|---|---|---|---|
| 2,045,502 | 6/1936 | Wade | 222—76 |
| 2,626,728 | 1/1953 | Harper | 137—99.5 |
| 2,859,759 | 11/1958 | Hurwitz | 137—101.21 |
| 3,200,224 | 8/1965 | Lux | 200—153.11 |

WILLIAM F. O'DEA, Primary Examiner

H. M. COHN, Assistant Examiner